United States Patent
Sirohiwala et al.

(10) Patent No.: US 11,162,815 B2
(45) Date of Patent: Nov. 2, 2021

(54) ANGULAR MAGNETIC FIELD SENSOR AND ROTATING TARGET WITH STRAY FIELD IMMUNITY

(71) Applicant: Allegro MicroSystems, LLC, Manchester, NH (US)

(72) Inventors: Ali Husain Yusuf Sirohiwala, San Francisco, CA (US); Nevenka Kozomora, Windham, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 153 days.

(21) Appl. No.: 16/131,656

(22) Filed: Sep. 14, 2018

(65) Prior Publication Data
US 2020/0088546 A1    Mar. 19, 2020

(51) Int. Cl.
*G01D 5/14*    (2006.01)
*G01D 5/16*    (2006.01)

(52) U.S. Cl.
CPC .............. *G01D 5/145* (2013.01); *G01D 5/16* (2013.01)

(58) Field of Classification Search
CPC .......... G01D 5/145; G01D 5/16; G01D 5/147; G01D 5/165; G01D 5/1655; G01R 33/06–098; G01B 7/30
See application file for complete search history.

(56) References Cited

U.S. PATENT DOCUMENTS

| | | | | |
|---|---|---|---|---|
| 4,746,862 A * | 5/1988 | Ueki | ...................... | G01P 3/487 324/174 |
| 5,367,257 A * | 11/1994 | Garshelis | .................. | G01P 3/44 324/165 |
| 5,757,180 A * | 5/1998 | Chou | ..................... | G01D 5/145 324/207.2 |
| 5,898,301 A * | 4/1999 | La Croix | ............. | G01D 5/2457 324/207.22 |
| 6,448,760 B1 * | 9/2002 | Neumann | ................ | G01B 7/30 324/207.2 |
| 6,515,471 B1 * | 2/2003 | Santos | ................. | G01D 5/2452 324/207.2 |

(Continued)

FOREIGN PATENT DOCUMENTS

EP     2546611 A1    1/2013
WO    WO 2014/029885 A1    2/2014

OTHER PUBLICATIONS

U.S. Appl. No. 15/909,208, filed Mar. 1, 2018, Kozomora et al.
(Continued)

*Primary Examiner* — Patrick Assouad
*Assistant Examiner* — Demetrius R Pretlow
(74) *Attorney, Agent, or Firm* — Daly Crowley Mofford & Durkee, LLP

(57) ABSTRACT

A system for detecting a magnetic target includes a magnetic field sensor comprising two or more sensing clusters positioned on a surface of a substrate; and a magnetic target comprising at least four magnetic quadrants spaced evenly around a center point of the magnetic target. The at least four magnetic quadrants have alternating magnetic polarities. The two or more sensing clusters are positioned evenly around the axis of rotation so that each of the sensing clusters detects a magnetic field of two magnetic quadrants that have the same magnetic polarity.

16 Claims, 9 Drawing Sheets

(56) References Cited

U.S. PATENT DOCUMENTS

| | | | | |
|---|---|---|---|---|
| 6,762,897 B1* | 7/2004 | Kabashima | ......... | G01D 5/2451 360/72.1 |
| 6,969,988 B2* | 11/2005 | Kakuta | ................ | G01D 5/14 324/207.2 |
| 7,469,604 B2* | 12/2008 | Hedayat | ............... | G01L 3/102 148/100 |
| 7,535,215 B2* | 5/2009 | Forster | ................ | G01D 5/145 324/165 |
| 7,714,570 B2 | 5/2010 | Thomas et al. | | |
| 7,911,203 B2 | 3/2011 | Thomas et al. | | |
| 7,994,774 B2 | 8/2011 | Thomas et al. | | |
| 8,125,216 B2* | 2/2012 | Thomas | ............... | G01D 5/2448 324/207.2 |
| 8,169,214 B2* | 5/2012 | Zak | ....................... | B60T 8/171 324/207.25 |
| 8,593,136 B2* | 11/2013 | Franke | ................. | G01D 5/145 324/207.2 |
| 8,659,289 B2* | 2/2014 | Saruki | ................. | G01R 33/093 324/207.23 |
| 8,749,227 B2 | 6/2014 | Thomas et al. | | |
| 9,081,041 B2* | 7/2015 | Friedrich | ......... | G01R 15/207 |
| 9,470,506 B2* | 10/2016 | Schaffer | ............. | G01P 3/487 |
| 9,557,191 B2* | 1/2017 | Hirota | .................... | G01D 5/14 |
| 9,625,278 B2* | 4/2017 | Nakamura | ........... | G01R 33/07 |
| 9,625,535 B2 | 4/2017 | Cadugan et al. | | |
| 9,664,752 B2 | 5/2017 | Monreal et al. | | |
| 9,733,106 B2 | 8/2017 | Judkins, III et al. | | |
| 9,797,746 B2 | 10/2017 | Vuillermet et al. | | |
| 9,852,832 B2 | 12/2017 | Sirohiwala et al. | | |
| 9,897,464 B2 | 2/2018 | Judkins, III et al. | | |
| 10,048,718 B2 | 8/2018 | Sirohiwala et al. | | |
| 10,066,964 B2 | 9/2018 | Sirohiwala et al. | | |
| 10,132,649 B2* | 11/2018 | Janisch | ................ | G01D 5/145 |
| 10,215,550 B2* | 2/2019 | Metivier | ................ | G01B 7/30 |
| 10,309,801 B2* | 6/2019 | Schott | .................... | G01D 5/145 |
| 10,502,589 B2* | 12/2019 | Granig | ................... | G01D 5/16 |
| 2009/0174395 A1* | 7/2009 | Thomas | ................ | G01D 5/145 324/207.2 |
| 2009/0295375 A1* | 12/2009 | Oohira | ................... | G01D 5/145 324/207.21 |
| 2009/0315541 A1* | 12/2009 | Zak | ....................... | B60T 8/171 324/207.2 |
| 2011/0187351 A1* | 8/2011 | Hunger | ................. | G01D 5/145 324/207.2 |
| 2011/0246133 A1 | 10/2011 | Harada et al. | | |
| 2012/0038359 A1* | 2/2012 | Saruki | ................... | B82Y 25/00 324/252 |
| 2012/0176070 A1* | 7/2012 | Wallrafen | .......... | G01D 5/24461 318/400.04 |
| 2012/0217955 A1* | 8/2012 | Petrie | .................... | G01D 5/145 324/207.2 |
| 2014/0176126 A1* | 6/2014 | Friedrich | ............... | G01R 33/02 324/207.2 |
| 2015/0022197 A1 | 1/2015 | David et al. | | |
| 2015/0142376 A1* | 5/2015 | Ausserlechner | ....... | G01D 5/145 702/151 |
| 2015/0362335 A1* | 12/2015 | Spitzer | ..................... | G01D 5/16 310/68 B |
| 2015/0377648 A1* | 12/2015 | Sirohiwala | ............. | G01D 5/165 324/207.2 |
| 2016/0123771 A1* | 5/2016 | David | .................... | G01D 5/147 324/207.2 |
| 2016/0161289 A1* | 6/2016 | Fujita | ................. | G01D 5/24471 324/207.21 |
| 2016/0178400 A1* | 6/2016 | Vuillermet | ......... | G01R 33/0005 |
| 2017/0016745 A1* | 1/2017 | Onaka | .................... | G01R 33/09 |
| 2017/0123016 A1* | 5/2017 | Deak | .................... | G01R 33/0011 |
| 2017/0219664 A1* | 8/2017 | Alpago | ................ | G01R 33/077 |
| 2017/0248445 A1* | 8/2017 | Ausserlechner | ... | G01D 5/24442 |
| 2017/0328701 A1* | 11/2017 | Ausserlechner | ......... | G01B 7/30 |
| 2017/0336481 A1 | 11/2017 | Latham et al. | | |
| 2018/0172481 A1* | 6/2018 | Mochizuki | ............. | G01D 5/145 |
| 2018/0231425 A1* | 8/2018 | Raths Ponce | .......... | G01L 3/102 |
| 2019/0120659 A1* | 4/2019 | Bussan | ................ | G01D 5/145 |
| 2019/0158007 A1* | 5/2019 | Mori | .................... | G01R 33/091 |
| 2019/0162559 A1* | 5/2019 | Ohta | ...................... | G01D 5/145 |
| 2019/0234764 A1* | 8/2019 | Lassalle-Balier | ........ | G01D 5/16 |
| 2019/0265071 A1* | 8/2019 | Ruigrok | .................. | G01D 5/16 |
| 2019/0383646 A1* | 12/2019 | Lassalle-Balier | ........ | G01D 5/16 |
| 2019/0383885 A1* | 12/2019 | Sitorus | ............... | G01D 5/24404 |

OTHER PUBLICATIONS

Extended European Search Report dated Jan. 23, 2020 for EP Application No. 19192640.1; 7 Pages.

Response (with Amended Claims) to European Official Communication dated Mar. 23, 2020 and to the Extended European Search Report and Written Opinion dated Jan. 23, 2020 for European Application No. 19192640.1; Response filed Sep. 17, 2020; 13 Pages.

European Examination Report dated Jun. 29, 2021 for European Application No. 19192640.01, 5 Pages.

* cited by examiner

ANGULAR MAGNETIC FIELD SENSOR AND ROTATING TARGET WITH STRAY FIELD IMMUNITY

FIELD

This disclosure relates to magnetic field sensors for sensing rotational angle.

BACKGROUND

Magnetic field sensors are used in a broad range of electromechanical applications. In the automotive industry, for example, magnetic field sensors are used to determine the angular position of various parts of an automobile such as cam shafts, brake rotors, transmission elements, etc. In some of these applications, a rotating target may be placed at the end of a rotating shaft. A magnetic field sensor positioned near the target may detect the target as it rotates and calculate the rotational position of the target, and thus the rotational position of the shaft. This information may be sent to a central computer that can monitor and control the automobile's operation.

In some instances, the magnetic field sensor may need to operate in an environment or location where an undesirable, external magnetic field exists. The external magnetic field may interfere with the way the magnetic field sensor detects the rotating target. For example, the external magnetic field may introduce common mode noise into the system, which can reduce the accuracy of the magnetic field sensor and/or introduce errors into the calculation of the rotational position of the target.

SUMMARY

In an embodiment, a system for detecting a magnetic target includes a magnetic field sensor comprising two or more sensing clusters positioned on a surface of a substrate; and a magnetic target comprising at least four magnetic quadrants spaced evenly around a center point of the magnetic target. The at least four magnetic quadrants have alternating magnetic polarities. The two or more sensing clusters are positioned evenly around the axis of rotation so that each of the sensing clusters detects a magnetic field of two magnetic quadrants that have the same magnetic polarity.

In another embodiment, a magnetic field sensor includes two or more sensing clusters positioned on a surface of a substrate so that they are spaced evenly around an axis of rotation of a rotating target. Each sensing cluster includes a first magnetic field sensing element having a first axis of maximum sensitivity parallel to the surface of the substrate and a second magnetic field sensing element having a second axis of maximum sensitivity parallel to the surface of the substrate.

In another embodiment, a system for detecting a magnetic target includes a magnetic field sensor comprising two or more sensing clusters positioned on a surface of a substrate, a rotating magnetic target comprising at least four magnetic quadrants spaced evenly around a center point of the magnetic target, and means for detecting a rotational position of the magnetic target. The at least four magnetic quadrants have alternating magnetic polarities

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

The term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, etc. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Some or all of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

The term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

The terms "target" and "magnetic target" are used to describe an object to be sensed or detected by a magnetic field sensor or magnetic field sensing element.

Figure 1:
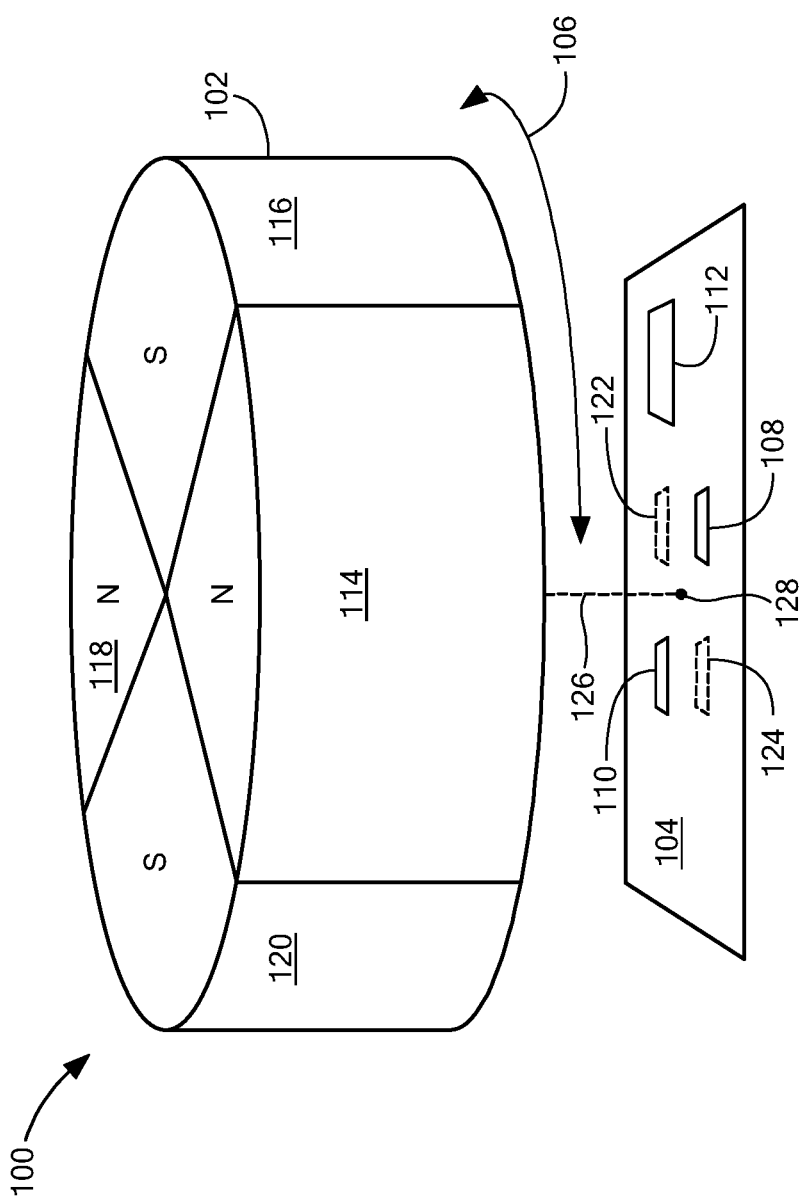
FIG. 1 is an isometric view of a system for detecting a target.

FIG. 1 is a diagram of a system 100 that includes a magnetic field sensor 104 for detecting rotation of magnetic target 102. Target 102 may be placed on a rotating object, for example on the end of a rotating shaft (not shown). As the shaft rotates, target 102 may also rotate in the direction of arrow 106.

Target 102 may have four (or more) sections or quadrants 114, 116, 118, and 120 having different magnetic polarities. In embodiments, the polarity of adjacent quadrants may alternate. In this example, quadrants 114 and 118 may have north polarity, indicated by the symbol 'N', and quadrants 116 and 120 may have south polarity, indicated by the symbol 'S'.

Sensor 104 may include sensing clusters 108 and 110. These clusters may include one or more multiple magnetic field sensing elements configured to detect the magnetic field generated by target 102. Sensing clusters 108 and 110 may also produce output signals representing the detected magnetic field. Sensor 104 may also include additional circuitry 112 to receive the signals from sensing clusters 108 and 110 and use them to calculate a rotational angle of target 102.

In embodiments, sensor 104 may also include additional sensing clusters 122 and 124. In certain embodiments, the number of sensing clusters will match the number of sections of target 102. In the example shown, target 102 has four sections and sensor 104 has four clusters. In other embodiments, the number of sections of target 102 and the number of sensing clusters 104 may differ from each other.

The axis of rotation 126 of target 102 may be centered between the sensing clusters at point 128 so that, as target 102 rotates, sections 114-120 pass over each sensing cluster 108, 110, 122, and 124. In such an embodiment, if target 102 is rotating at a constant speed, the output of each cluster may be an alternating periodic signal due to the north-polarity and south-polarity sections of target 102 passing over each cluster. In some embodiments, these circumstances may produce sine wave outputs signals from clusters 108, 110, 122, and 124.

Figure 2:
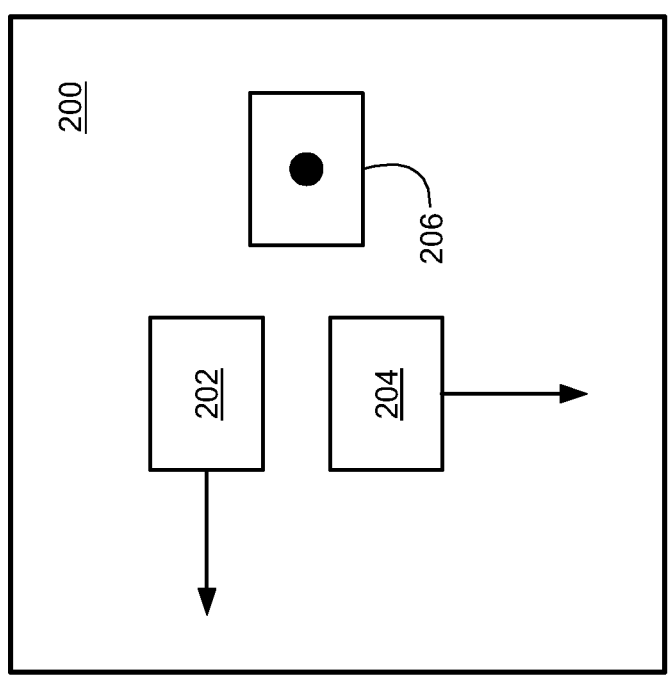
FIG. 2 is a block diagram of a sensing cluster.

Referring to FIG. 2, sensing cluster 200 is an example of a sensing cluster, which may be the same as or similar to sensing cluster 108, 110, 122, and/or 124. Sensing cluster 200 may include one or more magnetic field sensing elements 202, 204, and 206 to detect the magnetic field produced by target 102. Magnetic field elements 202, 204, and 206 may be magnetoresistive elements, Hall effect elements, or a combination of both. Although displayed as single elements, magnetic field elements 202, 204, and 206 may represent multiple magnetic field sensing elements. For example, magnetic field sensing element 202, 204, and/or 206 may each represent four magnetic field sensing elements arranged in a bridge circuit configuration. The bridge circuit may act similarly to a single magnetic field sensing element in that it may detect a magnetic field and produce an output signal representing the magnetic field. Often, the output of a bridge circuit may be a differential output signal.

In embodiments, magnetic field sensing elements 202, 204, and 206 may be arranged so that their respective axes of maximum sensitivity are aligned in different directions. If we assume a Cartesian coordinate system with a coordinate x in the horizontal direction, a coordinate y in the vertical direction, and a coordinate z into and out of the page, then magnetic field sensing element 202 is aligned with an axis of maximum sensitivity in the x direction, magnetic field sensing element 204 is aligned with an axis of maximum sensitivity in the y direction, and magnetic field sensing element 206 is aligned with an axis of maximum sensitivity in the z direction.

Each magnetic field sensing element 202-206 may produce an individual output signal representing a magnetic field detected by the respective magnetic field sensing element. For example, in the presence of an external magnetic field having a direction (e.g. polarity) in the x direction, magnetic field sensor 202 (which has an axis of maximum sensitivity in the x direction) may detect the external magnetic field and provide an output signal represented by the external magnetic field. Magnetic field sensing elements 204 and 206, because their axes of maximum sensitivity are not aligned with the external magnetic field, may produce output signals that do not indicate that the magnetic field has been detected. If the magnetic field changes direction to become aligned (or partially aligned) with the axes of maximum sensitivity of magnetic field sensing elements 204 and 206, then magnetic field sensing elements 204 and 206 may produce output signals representing the external magnetic field they detect.

Figure 3:
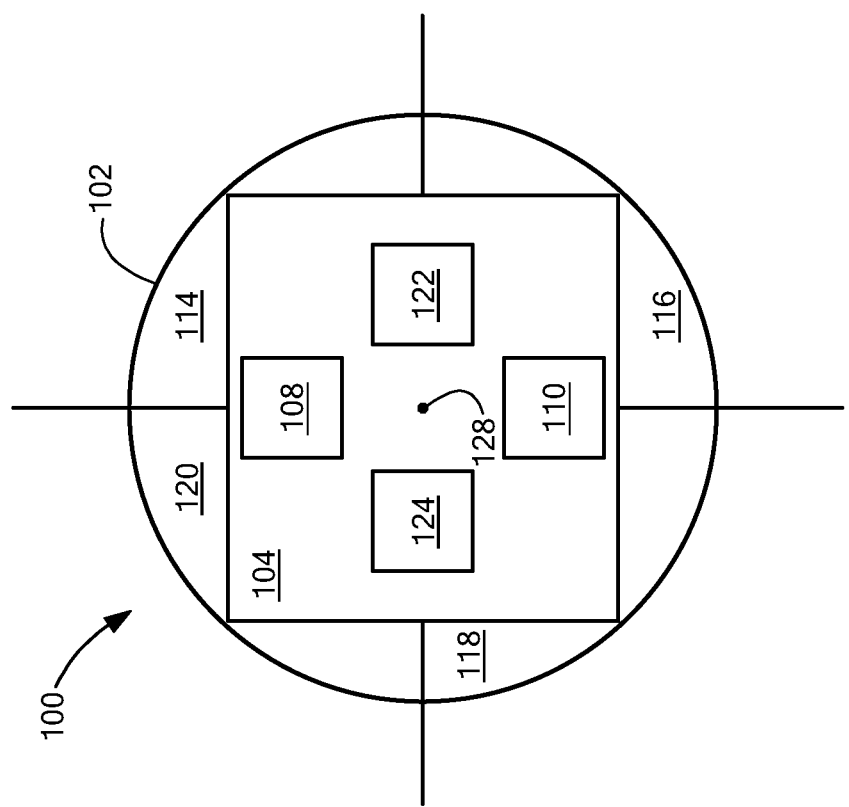
FIG. 3 is a plan view of the system of FIG. 1.

FIG. 3 is a view of system 100 along axis 126. As shown, sensing clusters 108, 110, 122, and 124 are positioned at ninety-degree intervals around central point 128. Quadrants 114-120 are also positioned at ninety-degree intervals around central point 128. In this arrangement, the quadrants 114-120 and the sensing clusters 108, 110, 122, and 124 have the same spacing about central point 128. In other embodiments, sensing clusters and sections of target 102 may have different spacing. For example, if target 102 has six sections and magnetic field sensor 104 has six sensing clusters, the sections and sensing clusters may be arranged at 60 degree increments around central point 128.

Figure 4:
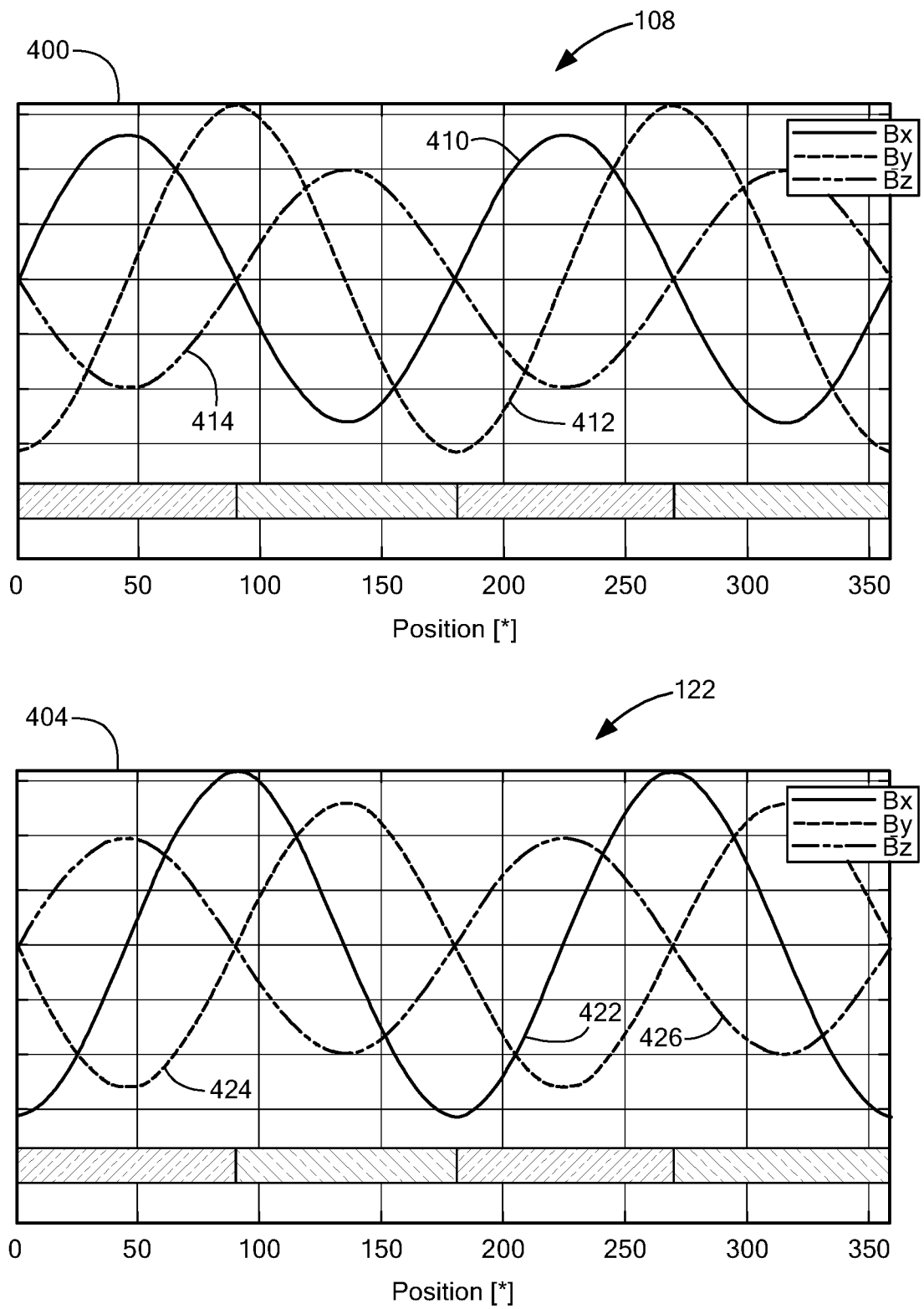
FIG. 4 is a series of graphs of output signals of sensing clusters.
Figure 4:
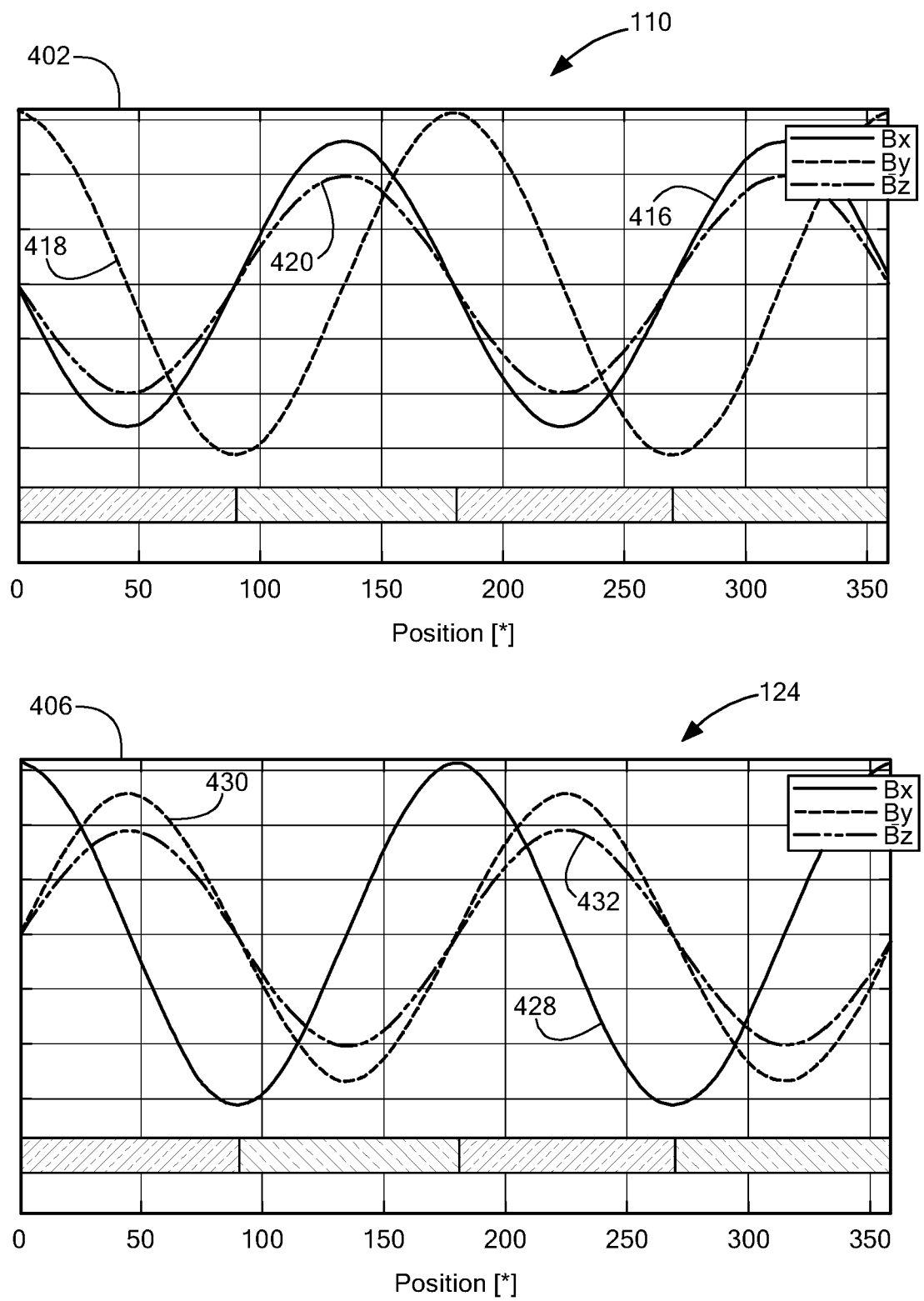

Referring to FIG. 4, a series of graphs 400-406 show the output of sensing clusters 108, 110, 122, and 124 as target 102 rotates. In each graph 400-408, the horizontal axis represents angular position of target 102 from 0 to 360 degrees, and the vertical axis represents the magnetic field strength (in arbitrary units) as detected by the magnetic field sensing elements of each sensing cluster. Graph 400 corresponds to the output signals of sensing cluster 108, graph 402 corresponds to the output signals of sensing cluster 110, graph 406 corresponds to the output signals of sensing cluster 122, and graph 408 corresponds to the output signals of sensing cluster 124.

As noted above, each sensing cluster may have a magnetic field sensing element with an axis of sensitivity in the x direction, a magnetic field sensing element with an axis of sensitivity in the y direction, and a magnetic field sensing element with an axis of sensitivity in the z direction. Each graph 400-406 shows the output signal from each magnetic field sensing element. In graph 400, waveforms 410, 412, and 414 correspond to the magnetic field sensing element aligned in the x direction, the y direction, and the z direction (respectively) of sensing cluster 108. In graph 402, waveforms 416, 418, and 420 correspond to the magnetic field sensing element aligned in the x direction, the y direction, and the z direction (respectively) of sensing cluster 110. In graph 404, waveforms 422, 424, and 426 correspond to the magnetic field sensing element aligned in the x direction, the y direction, and the z direction (respectively) of sensing cluster 122. In graph 406, waveforms 428, 430, and 432 correspond to the magnetic field sensing element aligned in the x direction, the y direction, and the z direction (respectively) or sensing cluster 124. As shown, due to the positioning and orientation of the sensing clusters, the output signals of each sensing cluster have different phases.

Figure 5:
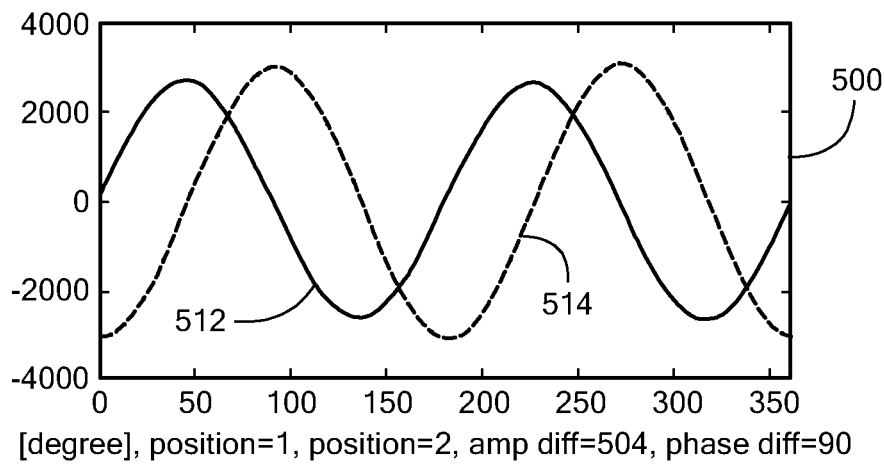
FIG. 5 is a series of graphs of processed and/or combined output signals of sensing clusters.
Figure 5:
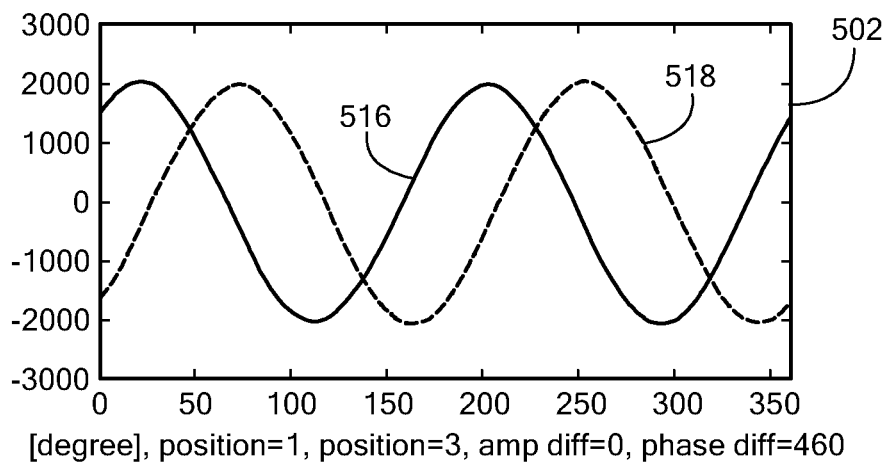
Figure 5:
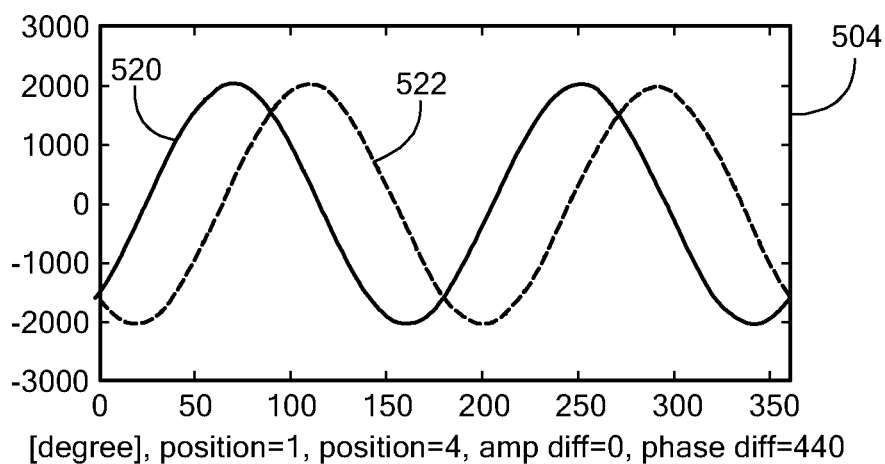
Figure 5:
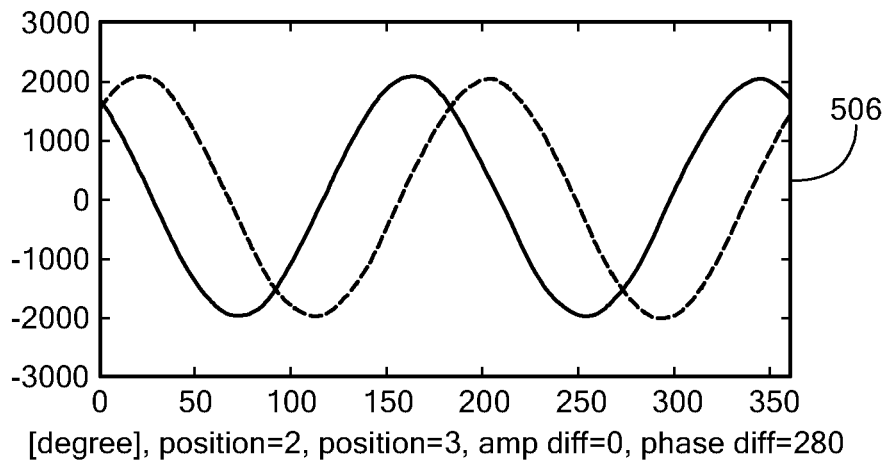
Figure 5:
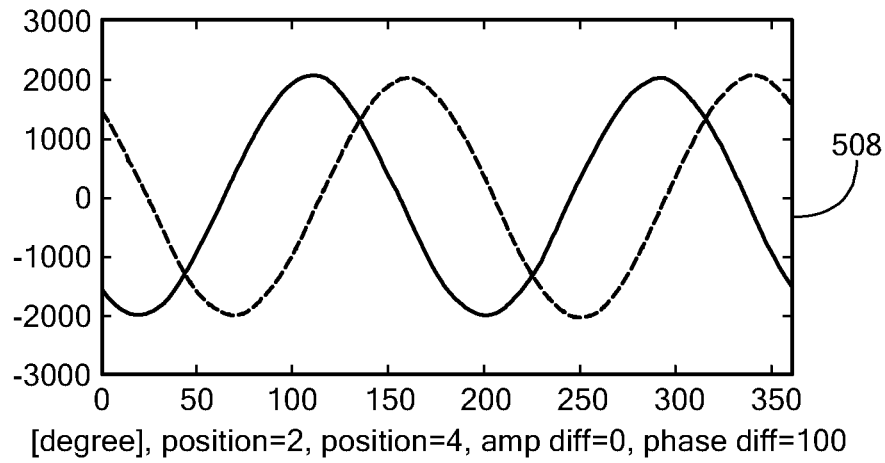
Figure 5:
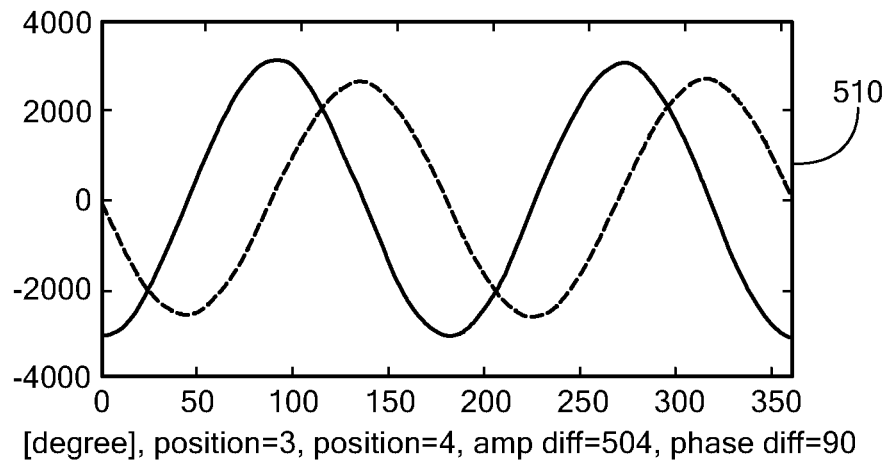

Referring to FIG. 5, some of the waveforms in FIG. 4 may be combined for processing. Graphs 500-510 illustrate the combination of signals from FIG. 4. In each graph 500-510, the horizontal axis represents angular rotation of the target from 0 to 360 degrees, and the vertical axis represents a combined signal, in arbitrary units, representing the detected magnetic field, as described below.

Graph 500 includes waveform 512 and waveform 514. Waveform 512 represents the difference between the x-direction output of sensing cluster 108 (i.e. waveform 410 in FIG. 4) and the x-direction output of sensing cluster 122 (i.e. waveform 416). Waveform 514 represents the difference between the y-direction output of sensing cluster 108 (i.e. waveform 412) and the y-direction output of sensing cluster 122 (i.e. waveform 424).

Graph 502 includes waveform 516 and waveform 518. Waveform 516 represents the difference between the x-direction output of sensing cluster 108 (i.e. waveform 410 in FIG. 4) and the x-direction output of sensing cluster 110 (i.e. waveform 416). Waveform 516 represents the difference between the y-direction output of sensing cluster 108 (i.e. waveform 412) and the y-direction output of sensing cluster 110 (i.e. waveform 418).

Graph 504 includes waveform 520 and waveform 522. Waveform 520 represents the difference between the x-direction output of sensing cluster 108 (i.e. waveform 410 in FIG. 4) and the x-direction output of sensing cluster 124 (i.e. waveform 428). Waveform 522 represents the difference between the y-direction output of sensing cluster 108 (i.e. waveform 412) and the y-direction output of sensing cluster 124 (i.e. waveform 430).

The waveforms in graphs 506-510 represent the differences in the x and y output signals of the remaining combinations of sensing clusters. For example, the waveforms in graph 506 represent the difference between the x and y output signals of sensing clusters 108 and 110, the waveforms in graph 508 represent the difference between the x and y output signals of sensing clusters 122 and 124, and the waveforms in graph 510 represent the difference between the x and y output signals of sensing clusters 110 and 124.

Waveforms representing the difference in z-direction output signals of the sensing clusters are not shown in FIG. 5, but could be generated by the magnetic field sensor.

Figure 6:
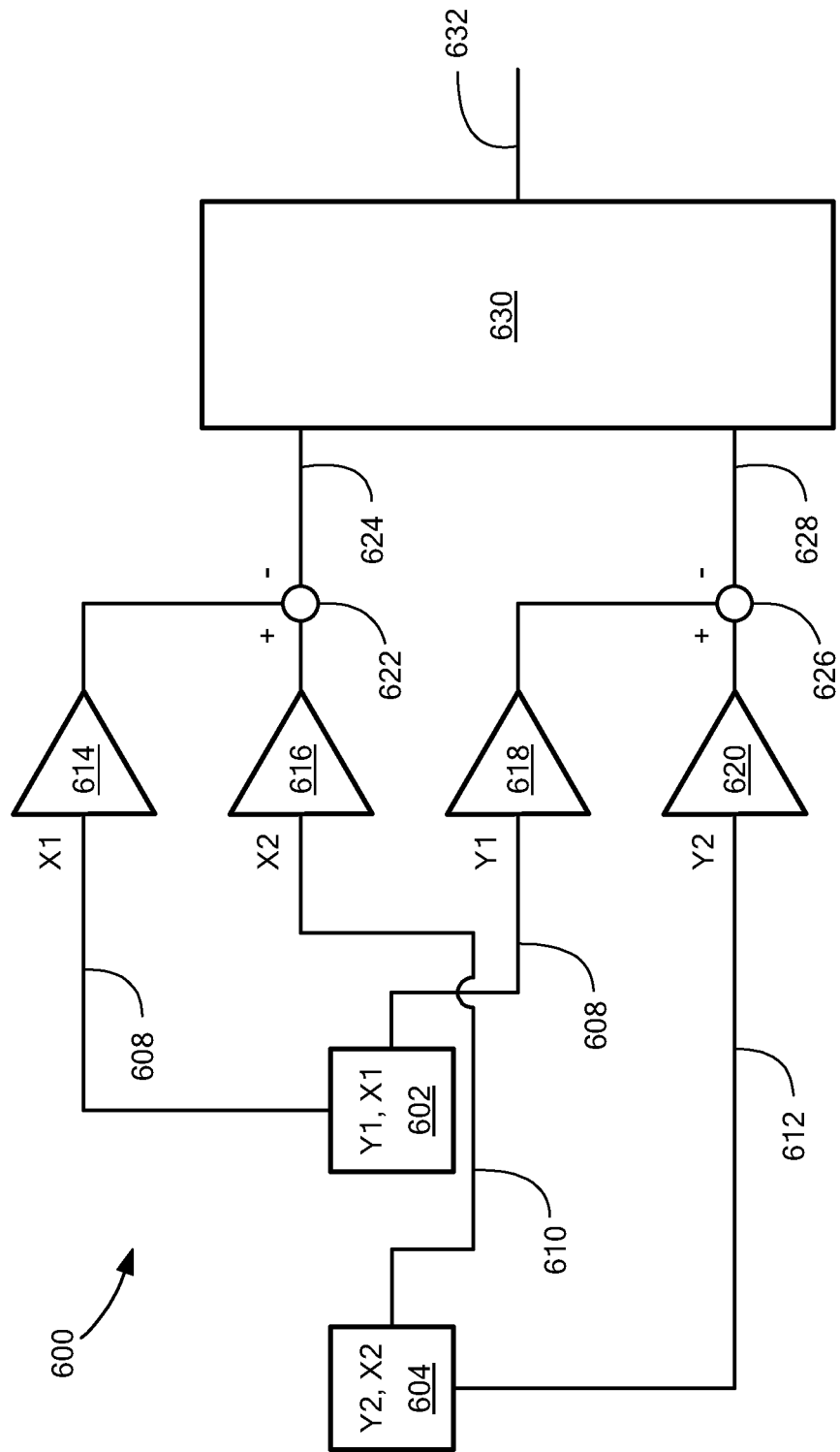
FIG. 6 is a circuit diagram of a magnetic field sensor for sensing a target.

FIG. 6 is a block diagram of an example circuit 600 to generate some of the signals shown in FIG. 5 and calculate an output signal 602 representing the rotational angle of the target (e.g. target 102 in FIG. 1). Two sensing clusters 602 and 604 may be used to detect the angular position of target 102.

Sensing clusters 602 and 604 may be the same as or similar to the sensing clusters described above. For ease of description, sensing clusters 602 and 604 may each contain two magnetic field sensing elements to sense magnetic fields in a two-dimensional Cartesian coordinate system having an x direction and a y direction, rather than the three magnetic field sensing elements shown in sensing cluster 200 in FIG. 2. However, circuit 600 and sensing clusters 602 and 604 may be adapted to include three magnetic field sensing elements per sensing cluster to measure a magnetic field in three Cartesian coordinates. Circuit 600 and sensing clusters 602 and 604 may also be adapted to include more than three magnetic field sensing elements per sensing cluster and to measure a magnetic field in more than three vector coordinates, if desired.

In addition, circuit 600 includes only two sensing clusters for ease of illustration. In embodiments, circuit 600 may include additional sensing clusters and additional circuitry to process the output signals of the sensing clusters.

Output signal 606 may correspond to the x-direction output of sensing cluster 602 and output signal 608 may correspond to the y-direction output of sensing cluster 602. Similarly, output signal 610 may correspond to the x-direction output of sensing cluster 604 and output signal 612 may correspond to the y-direction output of sensing cluster 604. In embodiments, output signal 606 may be the same as or similar to signal 410 (see FIG. 4), output signal 608 may be the same as or similar to signal 412, output signal 610 may be the same as or similar to output signal 416, and output signal 612 may be the same as or similar to output signal 418.

Circuit 600 may also include signal processing circuits 614, 616, 618, and 620 which may be coupled to receive and process signals 606, 608, 610, and 612, respectively. Signal processing circuits 614-620 may include amplifiers, filters, or other signal shaping circuits.

Difference circuit 622 may receive signals 606 and 610 (e.g. after they pass through signal processing circuits 614 and 616) and may produce difference signal 624. Difference signal 624 may represent the difference between signal 606 and 610 (i.e. the difference between the x-direction output signal of sensing cluster 602 and the x-direction output signal of sensing cluster 604). Difference signal 624 may be the same as or similar to signal 512 (see FIG. 5), for example.

Difference circuit 626 may receive signals 608 and 612 (e.g. after they pass through signal processing circuits 618 and 620) and may produce difference signal 628. Difference signal 628 may represent the difference between signal 608 and 612 (i.e. the difference between the y-direction output signal of sensing cluster 602 and the y-direction output signal of sensing cluster 604). Difference signal 628 may be the same as or similar to signal 514 (see FIG. 5), for example.

In embodiments, difference signal 624 and 628 may be quadrature signals. For example, difference signal 624 may represent (or be functionally related to) a cosine function of the angular position of target 102 and difference signal 628 may represent (or be functionally related to) a sine function of the angular position of target 102.

Circuit 600 may also include a processing circuit 630. Processing circuit 630 may include analog and/or digital circuits to process difference signals 624 and 628 in order to produce output signal 632. Output signal 632 may represent the angular position of target 102.

In embodiments, because difference signals 624 and 628 may represent processing circuit 630 they may perform an arctangent function to determine the angular position of target 102. In some instances, processing circuit 630 may implement a CORDIC algorithm that performs the arctangent calculation.

Placing pairs of sensing clusters so that they detect the magnetic field of two quadrants of target 102 that have the same magnetic polarity may reduce circuit 600's susceptibility to undesirable, external magnetic fields. For example, an external magnetic field may introduce common mode noise into the system. Calculating the difference (e.g. by difference circuits 622 and 626) between output signals of sensing clusters placed adjacent to quadrants of target 102 that have the same magnetic polarity may eliminate the common mode noise from external fields. In other words, difference circuits 622 and 626 may reject common mode noise caused by an undesirable external field. Thus, signals 624 and 628 may not include any signal effect from an external magnetic field.

Figure 7:
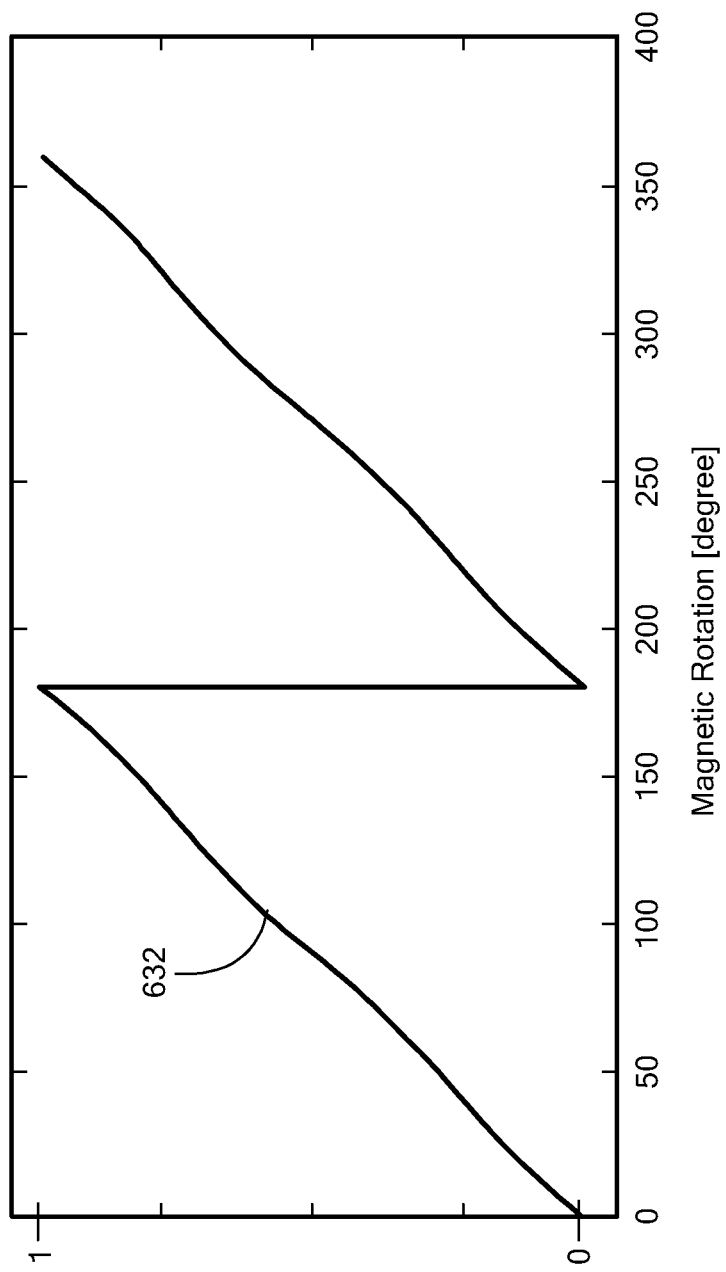
FIG. 7 is a graph of an output signal of the circuit of FIG. 6.

Referring to FIG. 7, graph 700 includes a waveform representing output signal 632 (i.e. the angular position of target 102). The horizontal axis of graph 700 represents the rotation, in degrees, of target 102. The vertical axis of graph 700 represents the voltage output, in arbitrary units, of output signal 632.

As target 102 rotates from 0 to 180 degrees, output signal 632 (which may be the output of the arctangent function) increases linearly. At 180 degrees, output signal 632 resets to 0. As target 102 rotates from 180 to 360 degrees, output signal 632 again increases linearly. Thus, during a full rotation from 0 to 360 degrees, signal 632 may produce two "teeth" of a sawtooth waveform. This may be due to the symmetrical quadrants of target 102 (see FIG. 1).

Processing circuit 630 may include a counter (or other circuit) to keep track of the teeth so that processing circuit 630 can determine if target 102 is at a position between 1 and 180 degrees or a position between 180 and 360 degrees. For example, the counter may begin at 0 and increment (e.g. from 0 to 1) when waveform 632 reaches 180 degrees. Then, the counter may decrement (e.g. from 1 to 0) when waveform 632 resets at 360 degrees. If the counter has a value of 0, processing circuit 630 may determine that the position of target 102 is between 0 and 180 degrees and, if the counter has a value of 1, processing circuit 630 may determine that the position of target 102 is between 180 and 360 degrees. In embodiments, other types of circuits may be used to keep track of whether target 102 is at a position between 0 and 180 degrees or at a position between 180 and 360 degrees.

Figure 8:
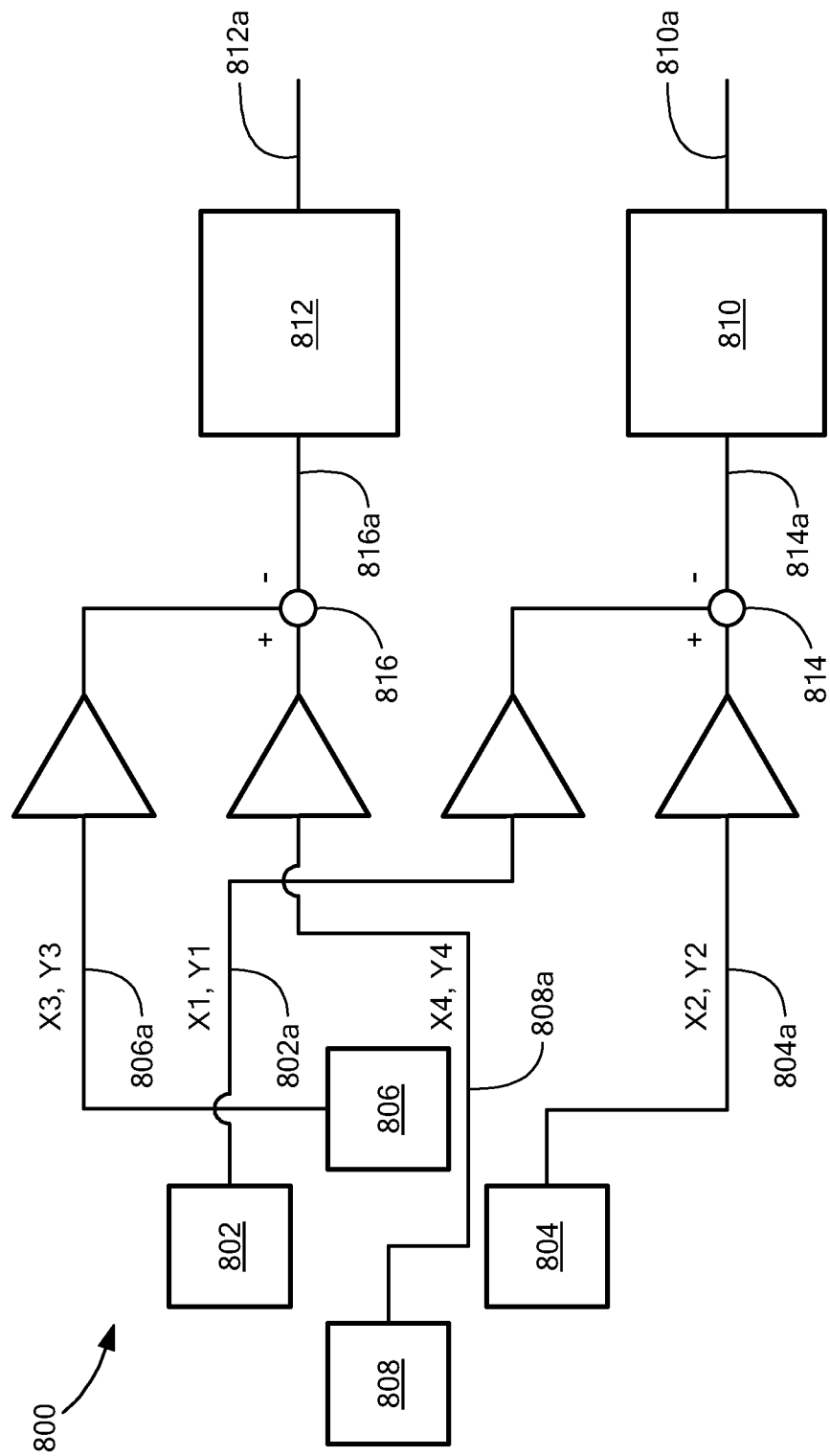
FIG. 8 is a circuit diagram of another embodiment of a magnetic field sensor for sensing a target.

Referring to FIG. 8, circuit 800 is a magnetic field sensor configured to detect rotation of magnetic target 102. Circuit 800 includes sensing clusters 802, 804, 806, and 808 which may be the same as sensing clusters 108, 110, 122, and 124, respectively (see FIG. 3). Sensing clusters 802, 804, 806, and 808 may be positioned and configured to detect the magnetic field produced by target 102.

Signal 802a represents the x-direction and y-direction output signals of sensing cluster 802. Signal 804a represents the x-direction and y-direction output signals of sensing cluster 804. Signal 806a represents the x-direction and y-direction output signals of sensing cluster 806. Signal 808a represents the x-direction and y-direction output signals of sensing cluster 808.

In embodiments, two sensing clusters may be used to detect the angular position of target 102, as described above in connection with FIG. 6. Circuit 800 may have two pairs of sensing clusters. Sensing clusters 802 and 804 may form a pair of sensing clusters that can detect the angular position of target 102, and sensing clusters 806 and 808 may form another pair of sensing clusters that can detect the angular position of target 102.

Processing circuits 810 and 812 may each be the same as or similar to processing circuit 630 (see FIG. 6) and may each receive inputs from difference circuits 814 and 816, respectively. Difference circuit 814 may generate signal 814a, which may represent the difference between the x and y measurements of sensing cluster 804 and the x and y measurements of sensing cluster 802. (Although shown as a single signal, signal 814a may be a bus that carries multiple signals). Processing circuit 810 may receive signal 814a and calculate output signal 810a, which may represent the angular position of target 102 as detected by sensing clusters 802 and 804. Signal 810a may be the same or similar to signal 632 (see FIG. 7). In embodiments, signal 814a may comprise one or more quadrature signals and processor 810 may perform an arctangent function (such as a CORDIC function) to generate signal 810a.

Difference circuit 816 may generate signal 816a, which may represent the difference between the x and y measurements of sensing cluster 806 and the x and y measurements of sensing cluster 808. (Although shown as a single signal, signal 816a may be a bus that carries multiple signals). Processing circuit 812 may receive signal 816a and calculate output signal 812a, which may represent the angular position of target 102 as detected by sensing clusters 806 and 808. Signal 812a may be the same as or similar to signal 632 (see FIG. 7). In embodiments, signal 816a may comprise one or more quadrature signals and processor 812 may perform an arctangent function (such as a CORDIC function) to generate signal 812a.

Based on the placement of sensing clusters 802-808, signal 816a and signal 814a may be 90 degrees out of phase. In this case, processing circuits 810 and 812 (or other downstream circuitry) may compensate for the phase difference. In other embodiments, sensing clusters 802-808 may be positioned so that signals 814a and 816a are in phase.

Sensor circuit 800 may include two parallel circuits for detecting target 102. The first parallel circuit may comprise sensing clusters 802 and 804, and processing circuit 810. The second parallel circuit may comprise sensing clusters 806 and 808, and processing circuit 812. These two parallel circuits may be used to generate redundant signals that can be used to detect or correct errors that may occur during operation of circuit 800.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that the scope of the patent should not be limited to the described embodiments but rather should be limited only by the spirit and scope of the following claims. All references cited herein are hereby incorporated herein by reference in their entirety.

The invention claimed is:

1. A system for detecting a magnetic target comprising:
 a magnetic field sensor comprising two or more sensing clusters positioned on a surface of a substrate; and
 a magnetic target comprising at least four magnetic quadrants spaced evenly around center point of the magnetic target wherein the at least four magnetic quadrants have alternating magnetic polarities;
 wherein the two or more sensing clusters are positioned evenly around the axis of rotation so that each of the sensing clusters detects a magnetic field of two magnetic quadrants that have the same magnetic polarity,
 wherein the sensing clusters each comprise a plurality of magnetic field sensing elements, and wherein each of the plurality of magnetic field sensing elements comprises:
  a first magnetic field sensing element having a first axis of maximum sensitivity parallel to the surface of the substrate; and
  a second magnetic field sensing element having a second axis of maximum sensitivity parallel to the surface of the substrate, wherein the first and second axes of maximum sensitivity parallel to the surface of the substrate are different; and a circuit to determine rotational position of the target based on sinusoidal magnetic field strength signals from the sensing clusters.

2. The system of claim 1 where the system comprises four sensing clusters.

3. The system of claim 2 wherein the four sensing clusters are positioned evenly around the axis of rotation so that each respective sensing cluster detects a magnetic field of magnetic quadrant adjacent to the respective sensing cluster.

4. The system of claim 1 wherein the first axis of maximum sensitivity and the second axis of maximum sensitivity are orthogonal to each other.

5. The system of claim 1 wherein at least one of the plurality of magnetic field sensing elements is a Hall effect element.

6. The system of claim 1 wherein at least one of the plurality of magnetic field sensing elements is a magnetoresistance element.

7. A magnetic field sensor comprising:

two or more sensing clusters positioned on a surface of a substrate so that they are spaced evenly around an axis of rotation of a rotating target:

wherein the sensing clusters each comprise a plurality of magnetic field sensing elements, and wherein each of the plurality of magnetic field sensing elements comprises:

a first magnetic field sensing element having a first axis of maximum sensitivity parallel to the surface of the substrate; and a second magnetic field sensing element having a second axis of maximum sensitivity parallel to the surface of the substrate, wherein the first and second axes of maximum sensitivity parallel to the surface of the substrate are different; and a circuit to determine rotational position of the target based on sinusoidal magnetic field strength signals from the sensing clusters.

8. The magnetic field sensor of claim 7 wherein the magnetic target comprising at least four magnetic quadrants spaced evenly around the axis of rotation, wherein the at least four magnetic quadrants have alternating magnetic polarities.

9. The magnetic field sensor of claim 8 wherein the at two sensing clusters are positioned evenly around the axis of rotation so that each of the sensing clusters detects a magnetic field of two magnetic quadrants that have the same magnetic polarity.

10. The magnetic field sensor of claim 8 where the system comprises four sensing clusters.

11. The magnetic field sensor of claim 10 wherein the four sensing clusters are positioned evenly around the axis of rotation so that each respective sensing cluster detects a magnetic field of magnetic quadrant adjacent to the respective sensing cluster.

12. The magnetic field sensor of claim 7 wherein the first axis of maximum sensitivity and the second axis of maximum sensitivity are orthogonal to each other.

13. The magnetic field sensor of claim 7 wherein at least one of the magnetic field sensing elements is a Hall effect element.

14. The magnetic field sensor of claim 7 wherein at least one of the magnetic field sensing elements is a magnetoresistance element.

15. A system for detecting a magnetic target comprising:

a magnetic field sensor comprising two or more sensing clusters positioned on a surface of a substrate; and a magnetic target comprising at least four magnetic quadrants spaced evenly around center point of the magnetic target wherein the at least four magnetic quadrants have alternating magnetic polarities;

wherein the two or more sensing clusters are positioned evenly around the axis of rotation so that each of the sensing clusters detects a magnetic field of two magnetic quadrants that have the same magnetic polarity, wherein the sensing clusters each comprise a plurality of magnetic field sensing elements, and wherein each of the plurality of magnetic field sensing elements comprises:

a first magnetic field sensing element having a first axis of maximum sensitivity parallel to the surface of the substrate;

a second magnetic field sensing element having a second axis of maximum sensitivity parallel to the surface of the substrate; and a third magnetic field sensing element with a third axis of maximum sensitivity substantially perpendicular to the surface of the substrate; and a circuit to determine rotational position of the target based on sinusoidal magnetic field strength signals from the sensing clusters.

16. A magnetic field sensor comprising:

two or more sensing clusters positioned on a surface of a substrate so that they are spaced evenly around an axis of rotation of a rotating target, each sensing cluster comprising:

a first magnetic field sensing element having a first axis of maximum sensitivity parallel to the surface of the substrate;

a second magnetic field sensing element having a second axis of maximum sensitivity parallel to the surface of the substrate; and a third magnetic field sensing element with an axis of maximum sensitivity substantially perpendicular to the surface of the substrate; and a circuit to determine rotational position of the target based on sinusoidal magnetic field strength signals from the sensing clusters.

* * * * *